(12) United States Patent
Behr et al.

(10) Patent No.: US 8,490,664 B2
(45) Date of Patent: Jul. 23, 2013

(54) PNEUMATIC VEHICLE TIRE

(75) Inventors: Ulrich Behr, Hannover (DE); Oliver Woidtke, Lagenhagen (DE); Claudia Bauer, Bad Nennendorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 76 days.

(21) Appl. No.: 13/098,771

(22) Filed: May 2, 2011

(65) Prior Publication Data
US 2011/0203709 A1  Aug. 25, 2011

Related U.S. Application Data

(63) Continuation of application No. PCT/EP2009/063304, filed on Oct. 13, 2009.

(30) Foreign Application Priority Data

Oct. 30, 2008  (DE) .......................... 10 2008 037 497

(51) Int. Cl.
*B60C 11/13*  (2006.01)

(52) U.S. Cl.
USPC ................................. 152/209.21; 152/209.24

(58) Field of Classification Search
USPC .................... 152/209.21, 209.22, 209.24
See application file for complete search history.

(56) References Cited

U.S. PATENT DOCUMENTS

| | | | | |
|---|---|---|---|---|
| 2,268,344 A | * | 12/1941 | Shesterkin | 152/209.18 |
| 2,756,797 A | * | 7/1956 | Campbell | 152/209.18 |
| 5,363,895 A | * | 11/1994 | Wells et al. | 152/209.2 |
| 6,415,835 B1 | * | 7/2002 | Heinen | 152/209.21 |
| 6,986,372 B2 | | 1/2006 | Below | |
| 7,004,216 B2 | | 2/2006 | Godefroid | |
| 7,537,033 B2 | * | 5/2009 | Yamane | 152/209.21 |

FOREIGN PATENT DOCUMENTS

| | | | |
|---|---|---|---|
| EP | 0 544 236 A1 | | 6/1993 |
| EP | 1 541 383 A2 | | 6/2005 |
| JP | 60-203505 A | | 10/1985 |
| JP | WO95/18022 | * | 7/1995 |
| JP | 2007-154624 | * | 1/2007 |
| SU | 962034 | * | 9/1982 |

OTHER PUBLICATIONS

International Search Report of PCT/EP2009/063304, Dated Nov. 13, 2009.

* cited by examiner

*Primary Examiner* — Steven D Maki
*Assistant Examiner* — Robert Dye
(74) *Attorney, Agent, or Firm* — Laurence A. Greenberg; Werner H. Stemer; Ralph E. Locher

(57) ABSTRACT

A pneumatic vehicle tire includes a tread rubber that is divided into tread elements, such as tread bars or circumferential ribs, by circumferential grooves and transverse grooves. A groove flank of a circumferential groove facing away from an outer shoulder runs at a first angle of inclination relative to the radial direction, and a groove flank opposite the groove flank facing away from the outer shoulder includes two flank portions respectively running at a second angle of inclination and a third angle of inclination relative to the radial direction. The radially inner flank portion has elevations that form a ribbed structure.

14 Claims, 4 Drawing Sheets

PNEUMATIC VEHICLE TIRE

CROSS-REFERENCE TO RELATED APPLICATION

This is a continuation, under 35 U.S.C. §120, of copending International Application No. PCT/EP2009/063304, filed Oct. 13, 2009, which designated the United States; this application also claims the priority, under 35 U.S.C. §119, of German Patent Application DE 10 2008 037 497.0, filed Oct. 30, 2008; the prior applications are herewith incorporated by reference in their entirety.

BACKGROUND OF THE INVENTION

Field of the Invention

The invention relates to a pneumatic vehicle tire with a tread or tread rubber, which is divided by circumferential grooves and transverse grooves into tread elements, such as tread bars or circumferential ribs, and which has an outer shoulder, situated on the outside, with respect to a vehicle, and an inner shoulder, facing the longitudinal axis of the vehicle. The tread rubber has at least one circumferential groove with a groove base extending over the circumference of the tread rubber and groove flanks extending radially outward on both sides of the groove base and delimiting the circumferential groove. One of the groove flanks is structured in a rib-like manner by a multiplicity of elevations oriented in the transverse direction of the tread rubber.

A pneumatic vehicle tire of that type is known, for example, from U.S. Pat. No. 6,986,372. The tread rubber thereof has a number of circumferential grooves running around in the circumferential direction and at least one of the two groove flanks of the circumferential grooves has a flank portion, directly adjoining the tread surface, which is structured in a rib-like manner by elevations. The flank portion or the elevations is/are oriented at an angle of 30° to 45° to the radial direction. The circumferential grooves are intended, in particular, to improve the snow-gripping properties of the tire. European Patent EP 0 544 236 B1 discloses a vehicle tire in which the tread rubber has at least one circumferential groove with groove flanks which delimit tread bars and have at least two lugs disposed approximately in a central region of the groove flanks, widening toward the groove base and configured in a sawtooth-shaped manner. A differing number of lugs is provided for a differing circumferential length of the tread bars. It is intended to use that configuration to increase the transfer of driving and braking forces while not excessively dividing up the tread rubber pattern by transverse grooves.

It is known that ribbed regions on groove flanks of circumferential grooves are advantageous for winter performance, in particular the gripping properties of the tread rubber on snow. However, it is also known that regions structured in a rib-like manner, projections and the like on groove flanks impair the aquaplaning behavior of the tire.

SUMMARY OF THE INVENTION

It is accordingly an object of the invention to provide a pneumatic vehicle tire, which overcomes the hereinafore-mentioned disadvantages of the heretofore-known tires of this general type and which satisfactorily resolves the conflict of objectives, that is providing good winter performance while maintaining good aquaplaning properties, in the case of a tire of the type mentioned above. The invention therefore correspondingly aims to improve a tire of the type mentioned above.

With the foregoing and other objects in view there is provided, in accordance with the invention, a pneumatic vehicle tire, comprising a tread or tread rubber having a circumference, a transverse direction, a radial direction, an outer shoulder disposed outwardly relative to a vehicle and an inner shoulder facing a longitudinal axis of the vehicle. The tread rubber is divided by circumferential grooves and transverse grooves into tread elements such as tread bars or circumferential ribs. The circumferential grooves include at least one circumferential groove with a groove base extending over the circumference of the tread rubber and groove flanks extending radially outwardly on both sides of the groove base and delimiting the at least one circumferential groove. One of the groove flanks of the circumferential groove which faces away from the outer shoulder runs at a first angle of inclination relative to the radial direction. Another of the groove flanks, lying opposite the groove flank facing away from the outer shoulder, has two flank portions including a radially outer flank portion running at a second angle of inclination relative to the radial direction and a radially inner flank portion running at a third angle of inclination relative to the radial direction. The third angle of inclination is greater than the second angle of inclination and the second angle of inclination is greater than the first angle of inclination. A multiplicity of elevations are oriented in the transverse direction of the tread rubber and form a ribbed structure on the radially inner flank portion.

The ribbing on the groove flank portion near the groove base improves the snow-gripping properties of the tread rubber. Snow is kept within the circumferential groove between the individual elevations of the ribbing, which is conducive to good snow-to-snow friction. In addition, the ribbing provided only on one side, on the groove flank facing the outer shoulder, near the groove base, improves the positive properties of an asymmetrically configured circumferential groove, in particular by supporting effects during dry handling, while the draining ability of the circumferential grooves, and consequently the aquaplaning behavior, are not impaired.

In accordance with another feature of the invention, the stabilizing effect of the elevations is enhanced by the elevations being bonded to the groove base and the radially outer flank portion.

In accordance with a further feature of the invention, it is of advantage both for the winter performance of the tire and for maintaining good aquaplaning properties if the height of the elevations is between 1.5 mm and 2 mm and the maximum cross-sectional width of the elevations is likewise between 1.5 mm and 2 mm.

In accordance with an added feature of the invention, it is favorable for the aforementioned supporting effects if the elevations configured in the manner of ribbing are disposed, in particular, in such a way that they directly adjoin one another, having a cross-sectional form which has its greatest cross-sectional width at its base on the flank portion.

In accordance with a concomitant feature of the invention, it is advantageous for the handling properties of the tire on dry roadways if the two groove flanks run at certain angles of inclination to the radial. In this case, the angle of inclination of the groove flank facing away from the outer shoulder should be between 0° and 20°, in particular between 3° and 8°, the angle of inclination of the radially outer flank portion of the groove flank facing the outer shoulder should be between 1° and 25°, in particular between 8° and 15°, and the angle of inclination of the radially inner flank portion of the groove flank facing the outer shoulder should be between 30° and 45°, in particular between 38° and 42°.

Other features which are considered as characteristic for the invention are set forth in the appended claims.

Although the invention is illustrated and described herein as embodied in a pneumatic vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
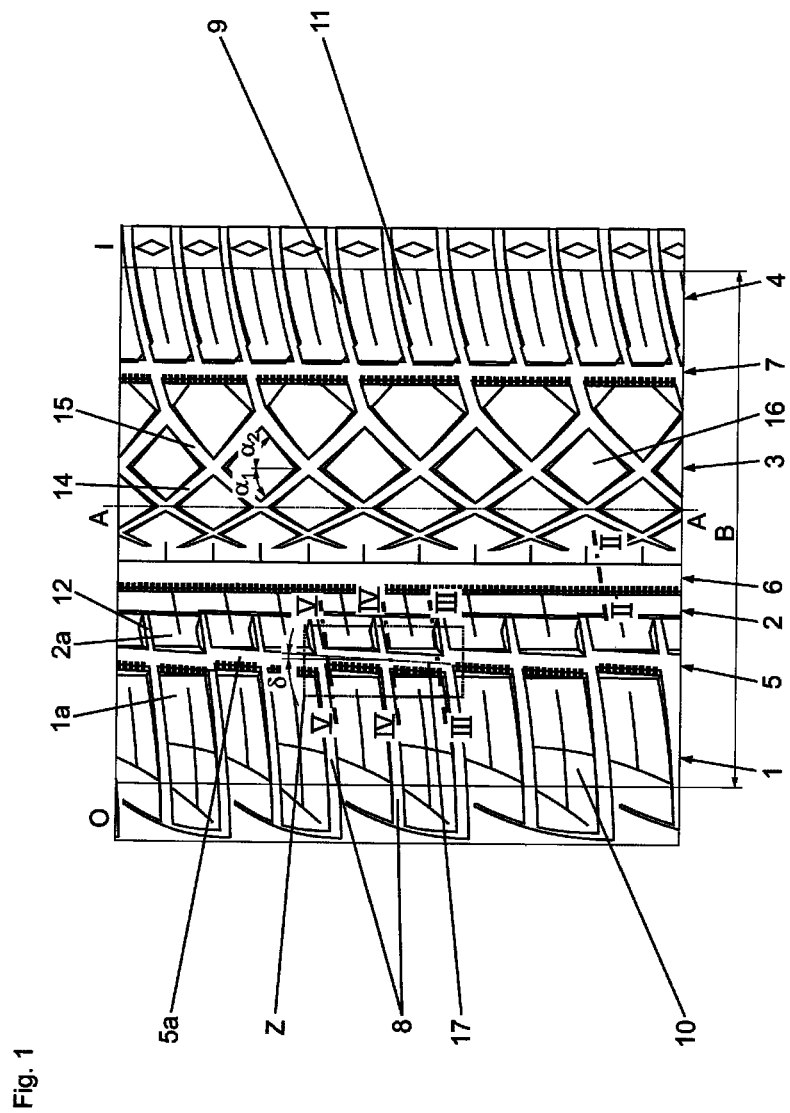
FIG. 1 is a diagrammatic, plan view of a partial development of a profiled tread rubber for a pneumatic vehicle tire for passenger cars.

Referring now to the figures of the drawings in detail and first, particularly, to FIG. 1 thereof, there is seen an asymmetric tread rubber pattern for a passenger car tire of the radial type, which is suitable in particular for year-round use. In FIG. 1, a line A-A denotes a central equatorial plane or equatorial line, dividing the tread or tread rubber into halves, reference symbol B denotes a contact width of the tread rubber when a tire with this tread rubber is fitted on a rim and is in the operating state under normal conditions, reference symbol O denotes an outer shoulder, located on the outside when the tire is fitted on the vehicle, and reference symbol I denotes an inner shoulder, facing the center of the vehicle.

As FIG. 1 shows, the pattern of the tread rubber, from the outer shoulder O to the inner shoulder I, has a row of tread bars 1, a circumferential rib 2 and a wide tread strip 3, taking up about 40% of the contact width B, running around in the circumferential direction and divided into tread bars 16. Circumferential grooves 5, 6 are respectively disposed between the row of tread bars 1 and the circumferential rib 2 as well as between the circumferential rib 2 and the tread strip 3. The circumferential grooves 5, 6 run around in the circumferential direction and have a width at the surface of the tread rubber on the order of magnitude of 7 mm to 8 mm. A row of tread bars 4 at the inner shoulder I is separated from the tread strip 3 by a circumferential groove 7, which runs around in the circumferential direction and is narrower than the circumferential grooves 5 and 6.

The two rows of tread bars 1 and 4 situated at the shoulders are divided by respective transverse grooves 8 and 9 into respective tread bars 10 and 11. The transverse grooves 8 and 9 run substantially in the axial direction or at an acute angle deviating only slightly from the axial direction. The circumferential rib 2 is divided into block-like tread elements 2a by blind channels 12. The blind channels 12 run from the circumferential grooves 5 as a continuation of the transverse grooves 8 and extend over approximately two thirds of the axial width of the circumferential rib 2.

In the wide tread strip 3, two groups of oblique grooves 14, 15, running in opposite directions diagonally over the tread rubber, form a kind of network which encloses the tread bars 16. The oblique grooves 14 and 15, respectively running substantially parallel to one another, run at respective angles $\alpha_1$ and $\alpha_2$ to the circumferential direction of the tire. The angles $\alpha_1$, $\alpha_2$ of the oblique grooves 14, 15 change continuously over the path followed by the grooves 14, 15, but are between 30° and 70° over a large part of the extent of the grooves 14, 15. The oblique grooves 14, 15 end on the inner side of the tread rubber within the tread bars 3 at a small distance from the circumferential groove 6.

Figure 2:
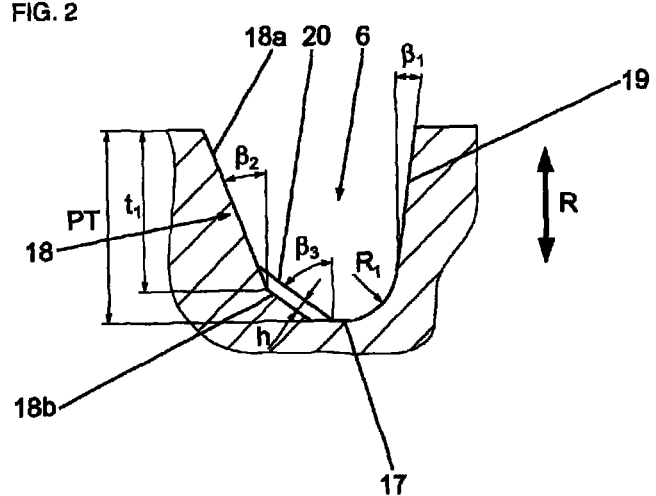
FIG. 2 is an enlarged sectional view taken along a line II-II of FIG. 1.

The circumferential grooves 5, 6 and 7 each have a particular cross section, that is described in more detail by way of example on the basis of FIG. 2, which represents a cross section through the circumferential groove 6. The circumferential groove 6 has a groove base 17, a groove flank 19 facing the inner shoulder I and a groove flank 18 facing the outer shoulder O. The groove flank 19 therefore delimits the tread strip 3 and the groove flank 18 delimits the circumferential rib 2. At least the groove flank 18 is inclined with respect to a radial direction (indicated by an arrow R in FIG. 2) in such a way that the circumferential groove 6 becomes wider in the direction of the surface of the tread rubber. The groove flank 19 forms an angle $\beta_1$ with the radial direction which is between 0° and 20°, in particular between 3° and 8°. The groove flank 18 is made up of two flank portions 18a, 18b in the radial direction. The flank portion 18a reaches to a depth $t_1$, measured from the surface of the tread, which lies between 70% and 80% of a tread depth PT. The flank portion 18a runs at an angle $\beta_2$ to the radial direction R which is between 1° and 25°, in particular between 8° and 15°. The flank portion 18b runs to the groove base 17 and is inclined with respect to the radial direction at an angle $\beta_3$, where $\beta_3 > \beta_2 > \beta_1$. The angle $\beta_3$ is between 30° and 45°, in particular between 38° and 42°. A transition between the groove base 17 and the groove flank 19 is configured in a rounded manner with a radius of curvature $R_1$, wherein a relationship 2 mm $\leq R_1 \leq$ 6 mm, in particular 3 mm $\leq R_1 \leq$ 4 mm, applies for $R_1$. The groove base 17 extends in the axial direction between the transitional region, rounded with a radius $R_1$, and the flank portion 18b and may have a width or axial extent of up to 6 mm. The groove cross section may also be configured in such a way that the flank portion 18b is adjoined directly by the rounded transitional region to the groove flank 19, with this transitional region then also including the groove base.

The flank portion 18b is ribbed according to the invention and has a multiplicity of elevations 20 oriented parallel to one another and in the transverse direction of the tread rubber. The elevations 20 have a triangular cross-sectional form, extend parallel to the flank portion 18b and are bonded both to the groove base 17 and to the flank portion 18a. A height h of the elevations is between 1.5 and 2 mm and their width in the circumferential direction at their base located on the flank portion 18b is likewise between 1.5 and 2 mm. The elevations 20 directly adjoin one another.

In the case of further embodiments of the invention that are not shown, the elevations 20 may have a different cross section, for example a trapezoidal, approximately rectangular, rounded, for example semicircular, cross section and the like, and they may either adjoin one another directly or be spaced apart from one another slightly, by a spacing on the order of magnitude of 0.5 to 3 mm. It is also possible to place the elevations 20 in such a way that they run at an incline with respect to the transverse direction of the tread rubber at an acute angle of at most 30°.

The rib-like structure formed by the elevations 20 near the groove base 17 increases the snow-gripping properties of the tread rubber. In particular, snow is kept in the circumferential grooves 6 between the individual elevations 20, so that the snow-to-snow friction with respect to the underlying surface is significantly improved. The rib-like structure in this case is only formed on the outer side of the circumferential groove 6 and has a stabilizing effect on the tread elements adjoining the groove flank 18, which is of advantage when driving on dry roadways and, in particular, improves dry handling. The aquaplaning behavior of the tire is not disadvantageously influenced by the special configuration.

Figure 1B:
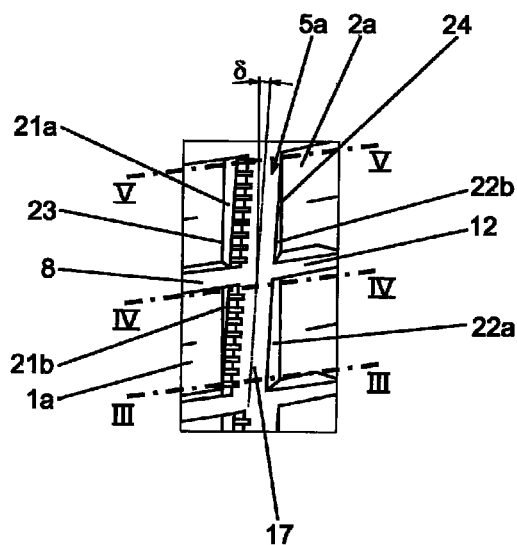
FIG. 1B is an enlarged plan view of a portion Z of FIG. 1.
Figure 1A:
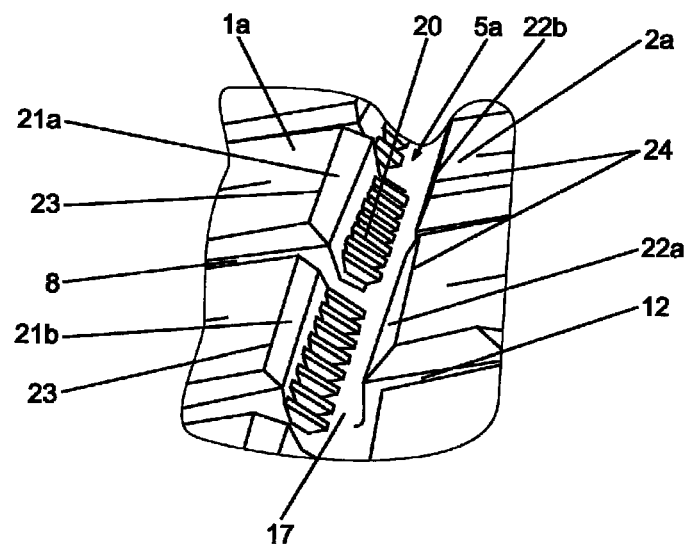
FIG. 1A is an enlarged, fragmentary, perspective view of a portion of FIG. 1.

The tread rubber has a further particular configuration in the region of the circumferential grooves 5, which runs between the row of tread bars 1 at the outer shoulder O and the circumferential rib 2. As FIG. 1 shows in conjunction with FIG. 1A and the sectional representations in FIG. 3 to FIG. 5, in each case two bars 1a and two tread elements 2a are formed in such a way that the circumferential groove 5 is made up of circumferential portions 5a in the circumferential direction, which consequently run over two mutually adjacent tread bars 1a and two block-like tread elements 2a of the circumferential rib 2 lying opposite them in each case. As FIG. 1B shows, the groove base 17 extends within the circumferential portions 5a at a constant angle δ, which is chosen between 2° and 7°, to the circumferential direction. The individual circumferential portions 5a are therefore slightly offset with respect to one another in the axial direction.

At the surface of the tread, the tread bars 1a and the block-like elements 2a lying opposite them are beveled at their regions delimiting the circumferential portions 5a over the length of the circumferential portions 5a. The bevels have the effect of forming sloping surfaces 21a, 21b and 22a, 22b, which are separated from one another by the transverse grooves 8 and 12. However, the sloping surfaces 21a, 21b and 22a, 22b are formed in such a way that they can be connected by way of the grooves 8 and 12 to form a unified area (see FIG. 1a). On a new tire, the sloping surfaces 21a, 21b and 22a, 22b are delimited at the surface of the tread by edges 23, 24, which run parallel to one another and in the circumferential direction of the tire. The sloping surfaces 21a, 21b and 22a, 22b are trapezoids, one base line of which runs along the respective edge 23 or 24 and the other base line of which runs parallel to the extent of the groove base 17. The height of the trapezoid surfaces is between 1.5 mm and 2.5 mm. The sloping surfaces 21a, 21b and 22a, 22b are consequently inclined with respect to the radial direction R at an angle γ changing in their circumferential extent.

Figure 3:
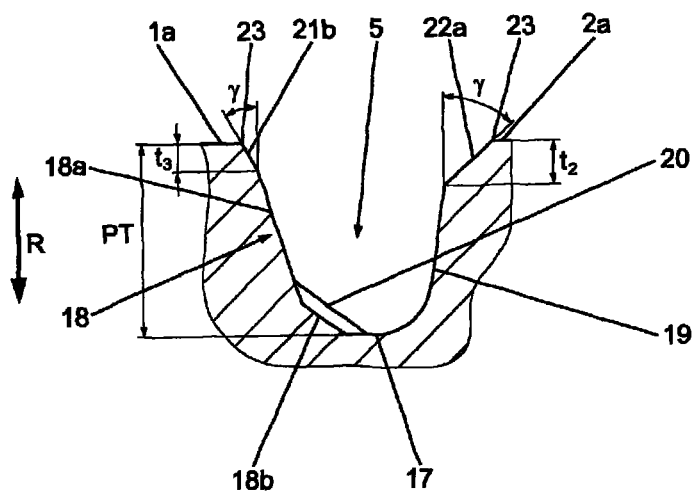
FIG. 3 is an enlarged sectional view taken along a line III-III of FIG. 1 or FIG. 1B.
Figure 4:
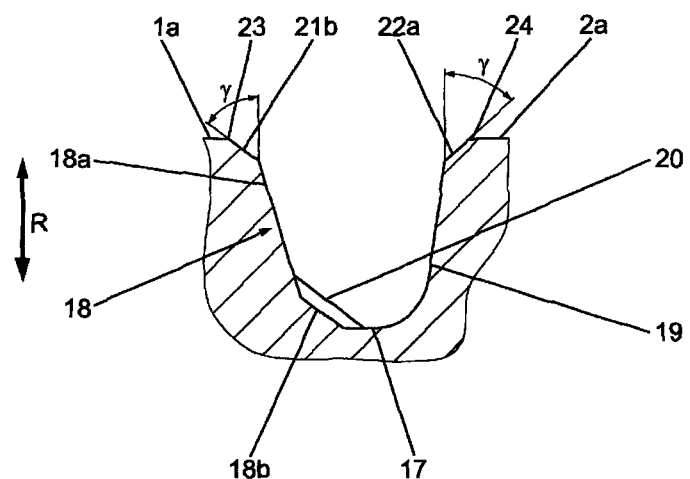
FIG. 4 is an enlarged sectional view taken along a line IV-IV of FIG. 1 or FIG. 1B.
Figure 5:
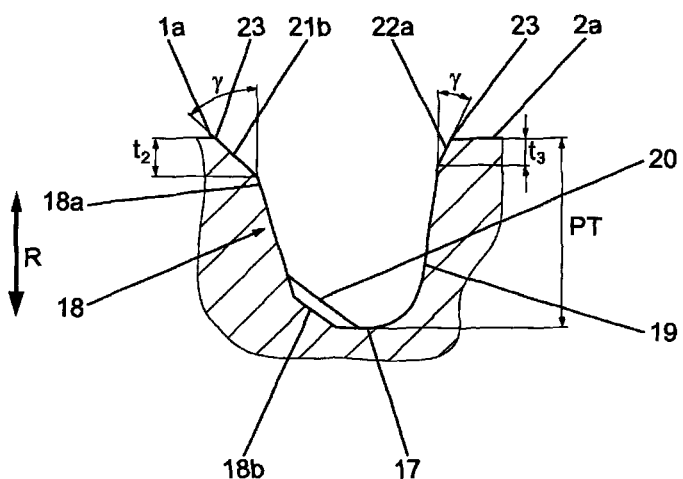
FIG. 5 is an enlarged sectional view taken along a line V-V of FIG. 1 or FIG. 1B.

This embodiment of the sloping surfaces 21a, 21b and 22a, 22b is explained in more detail below on the basis of the sectional representations in FIG. 3 to FIG. 5. By analogy with the circumferential grooves 6 already described, the circumferential groove 5 is delimited by a groove base 17, a groove flank 19 and a groove flank 18 with flank portions 18a and 18b and the rib structure of the elevations 20 is formed on the flank portion 18b, as described above. FIG. 3 shows a cross section just before one end of a circumferential portion 5a. The groove flank 18 is adjoined toward the surface of the tread rubber by the sloping surface 21b and the opposite groove flank 19 is adjoined by the sloping surface 22a. The sloping surface 22a reaches at this point to a depth $t_2$, which, measured from the surface of the tread, is between 20% and 35% of the tread depth PT. The sloping surface 21b reaches to a depth $t_3 < t_2$ of up to 25% of the tread depth PT. The angle of inclination γ of the area 22a in relation to the radial direction R in the case of the embodiment shown is at this point approximately 50°. The angle of inclination γ of the sloping surface 21b is somewhat smaller and is approximately 30°. In the central region of the circumferential portion 5a, in the direct vicinity of the transverse grooves 8 and 12, the circumferential portion 5a has a cross section shown in FIG. 4. The groove flanks 18 and 19 go over into the sloping surfaces 21b, 22a, the angles of inclination γ of which at this point are of approximately the same size and, in the case of the embodiment shown, are approximately 45° to 50°. FIG. 5 shows a cross section just before the second end of the circumferential portion 5a. The sloping surface 22b, which adjoins the groove flank 19, runs at an angle of inclination γ of 30° to the radial. The sloping surface 21a at the opposite groove flank 18 runs at an angle of inclination γ of 50° to the radial direction. The angle of inclination γ changes in the described manner over the circumferential path of the sloping surfaces 21a, 21b and 22a, 22b in a range from 25° to 60°.

This configuration according to the invention has the effect that edges that are straight and continuous in the circumferential direction are formed at the surface of the tread, but toward the groove base there is a lateral offset of bars and blocks. Therefore, many edges are made available, edges that are required for good gripping on snow, while the so-called look-through of the circumferential groove 5 is not reduced to such an extent that there is a noticeable influence on the aquaplaning property of the tire.

The invention is not restricted to the embodiments represented. In particular, regions structured in a rib-like manner may be provided in one or more circumferential grooves. Offsets of bars and blocks and sloping surfaces formed by bevels may likewise be formed in the region of one or more circumferential grooves.

The invention claimed is:
1. A pneumatic vehicle tire, comprising:
a tread rubber having a circumference, a transverse direction, a radial direction, an outer shoulder disposed outwardly relative to a vehicle and an inner shoulder facing a longitudinal axis of the vehicle;
said tread rubber being divided by circumferential grooves and transverse grooves into tread elements formed as tread bars or circumferential ribs;
said circumferential grooves including at least one circumferential groove with an outer side nearer said outer shoulder, a groove base extending over said circumference of said tread rubber and groove flanks extending radially outwardly on both sides of said groove base and delimiting said at least one circumferential groove;
one of said groove flanks of said circumferential groove facing away from said outer shoulder running at a first angle of inclination relative to said radial direction;
another of said groove flanks, lying opposite said groove flank facing away from said outer shoulder, having two flank portions including a radially outer flank portion running at a second angle of inclination relative to said radial direction and a radially inner flank portion running at a third angle of inclination relative to said radial direction; and
a multiplicity of elevations oriented in said transverse direction of said tread rubber and forming a ribbed structure on said radially inner flank portion, said ribbed structure only being formed on said outer side of said circumferential groove.

2. The pneumatic vehicle tire according to claim 1, wherein said elevations are bonded to said groove base and said radially outer flank portion.

3. The pneumatic vehicle tire according to claim 1, wherein said elevations have a height of between 1.5 mm and 2 mm.

4. The pneumatic vehicle tire according to claim 1, wherein said elevations have a maximum cross-sectional width of between 1.5 mm and 2 mm.

5. The pneumatic vehicle tire according to claim 1, wherein said elevations directly adjoin one another.

6. The pneumatic vehicle tire according to claim 1, wherein said elevations have a cross-sectional shape with a base and a greatest cross-sectional width at said base of said cross-sectional shape on said radially inner flank portion.

7. The pneumatic vehicle tire according to claim 1, wherein said first angle of inclination of said one groove flank facing away from said outer shoulder is between 0° and 20°.

8. The pneumatic vehicle tire according to claim 1, wherein said first angle of inclination of said one groove flank facing away from said outer shoulder is between 3° and 8°.

9. The pneumatic vehicle tire according to claim 1, wherein said other groove flank faces said outer shoulder, and said second angle of inclination of said radially outer flank portion of said other groove flank is between 1° and 25°.

10. The pneumatic vehicle tire according to claim 1, wherein said other groove flank faces said outer shoulder, and said second angle of inclination of said radially outer flank portion of said other groove flank is between 8° and 15°.

11. The pneumatic vehicle tire according to claim 1, wherein said other groove flank faces said outer shoulder, and said third angle of inclination of said radially inner flank portion of said other groove flank is between 30° and 45°.

12. The pneumatic vehicle tire according to claim 1, wherein said other groove flank faces said outer shoulder, and said third angle of inclination of said radially inner flank portion of said other groove flank is between 38° and 42°.

13. The pneumatic vehicle tire according to claim 1, wherein said tread rubber has a surface and a tread depth, said other groove flank faces said outer shoulder, and said radially outer flank portion of said other groove flank reaches to a depth of between 50% and 80% of said tread depth as measured from said surface of said tread rubber in said radial direction.

14. A pneumatic vehicle tire, comprising:

a tread rubber having a circumference, a transverse direction, a radial direction, an outer shoulder disposed outwardly relative to a vehicle and an inner shoulder facing a longitudinal axis of the vehicle;

said tread rubber being divided by circumferential grooves and transverse grooves into tread elements formed as tread bars or circumferential ribs;

said circumferential grooves including at least one circumferential groove with a groove base extending over said circumference of said tread rubber and groove flanks extending radially outwardly on both sides of said groove base and delimiting said at least one circumferential groove;

one of said groove flanks of said circumferential groove facing away from said outer shoulder running at a first angle of inclination relative to said radial direction;

another of said groove flanks, lying opposite said groove flank facing away from said outer shoulder, having two flank portions including a radially outer flank portion running at a second angle of inclination relative to said radial direction and a radially inner flank portion running at a third angle of inclination relative to said radial direction; and a multiplicity of elevations oriented in said transverse direction of said tread rubber, defining a ribbed structure on said radially inner flank portion, and extending only from said radially outer flank portion to said base.

* * * * *